(12) United States Patent
Quintero et al.

(10) Patent No.: US 8,235,120 B2
(45) Date of Patent: *Aug. 7, 2012

(54) MESOPHASE FLUIDS WITH EXTENDED CHAIN SURFACTANTS FOR DOWNHOLE TREATMENTS

(75) Inventors: Lirio Quintero, Houston, TX (US); David E. Clark, Humble, TX (US); Jean-Louis Salager, Merida (VE); Ana Forgiarini, Merida (VE)

(73) Assignee: Baker Hughes Incorporated, Houston, TX (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/414,888

(22) Filed: Mar. 31, 2009

(65) Prior Publication Data

US 2009/0183877 A1 Jul. 23, 2009

Related U.S. Application Data

(63) Continuation-in-part of application No. 12/146,647, filed on Jun. 26, 2008, and a continuation-in-part of application No. 11/866,486, filed on Oct. 3, 2007.

(60) Provisional application No. 60/947,870, filed on Jul. 3, 2007.

(51) Int. Cl.
*E21B 37/00* (2006.01)
*E21B 21/00* (2006.01)
(52) U.S. Cl. ................................ 166/312; 166/305.1
(58) Field of Classification Search .................. None
See application file for complete search history.

(56) References Cited

U.S. PATENT DOCUMENTS

| | | | |
|---|---|---|---|
| 4,017,405 A | 4/1977 | Holm | |
| 4,293,428 A * | 10/1981 | Gale et al. | 507/238 |
| 5,807,810 A | 9/1998 | Blezard et al. | |
| 5,964,692 A | 10/1999 | Blezard et al. | |
| 6,166,095 A | 12/2000 | Bryan et al. | |

(Continued)

FOREIGN PATENT DOCUMENTS

WO WO2006109016 * 10/2006

OTHER PUBLICATIONS

J. L. Salager, et al., "Mixing Rules for Optimum Phase-Behavior Formulations of Surfactant/Oil/Water Systems," Society of Petroleum Engineers Journal 19, Oct., 1979, pp. 271-278.

(Continued)

*Primary Examiner* — Angela M DiTrani
(74) *Attorney, Agent, or Firm* — Mossman Kumar & Tyler PC

(57) ABSTRACT

Mesophase fluids may be pre-formed or formed in situ and may be used downhole for various treatments including, but not limited to, cleaning up and removing non-polar materials from reservoir production zones, removing wellbore damage, releasing stuck pipe, components in spacers and pills and the like in oil and gas wells. These treatments involve solubilization of the non-polar material into the emulsion when the treatment fluid contacts non-polar materials. These mesophase fluids use extended chain surfactants having propoxylated/ethoxylated spacer arms. The extended chain surfactants are intramolecular mixtures containing hydrophilic and lipophilic portions. They attain high solubilization in the mesophase fluids (e.g. single phase microemulsions), are in some instances insensitive to temperature and are useful for a wide variety of oil types.

24 Claims, 1 Drawing Sheet

U.S. PATENT DOCUMENTS

2004/0063795 A1* 4/2004 VonKrosigk et al. ............ 516/38
2006/0165739 A1 7/2006 Komesvarakul et al.
2006/0211593 A1 9/2006 Smith et al.

OTHER PUBLICATIONS

M. Minana-Perez, et al., "Systems Containing Mixtures of Extended Surfactants and Conventional Nonionics. Phase Behavior and Solubilization in Microemulsion," 4th World Surfactants Congress Proceedings, Jun. 3-7, 1996, vol. 2, pp. 226-234.

J. L. Salager, et al., "Enhancing Solubilization in Microemulsions—State of the Art and Current Trends," Journal of Surfactants and Detergents, Jan., 2005, vol. 8, No. 1, pp. 3-21.

Y. Wu, et al., "A Study of Branched Alcohol Propoxylate Sulfate Surfactants for Improved Oil Recovery," SPE 95404, 2005 SPE Annual Technical Conference and Exhibition, Oct. 9-12, 2005, Dallas, Texas.

Y. Wu, et al., "A Study of Wetting Behavior and Surfactant EOR in Carbonates with Model Compounds," SPE 99612, 2006 SPE/DOE Symposium on Improved Oil Recovery, Apr. 22-26, 2006, Tulsa, Oklahoma.

Alfoterra Surfactants, Technical Bulletin, Apr. 12, 2007, pp. 1-2.

J. L. Salager, et al., "Amphiphilic Mixtures versus Surfactant Structures with Smooth Polarity Transition across Interface to Improve Solubilization Performance," CESIO 2008—7th World Surfactant Congress, Paris, Paper No. O-A17, Jun. 22-25, 2008, pp. 1-9.

* cited by examiner

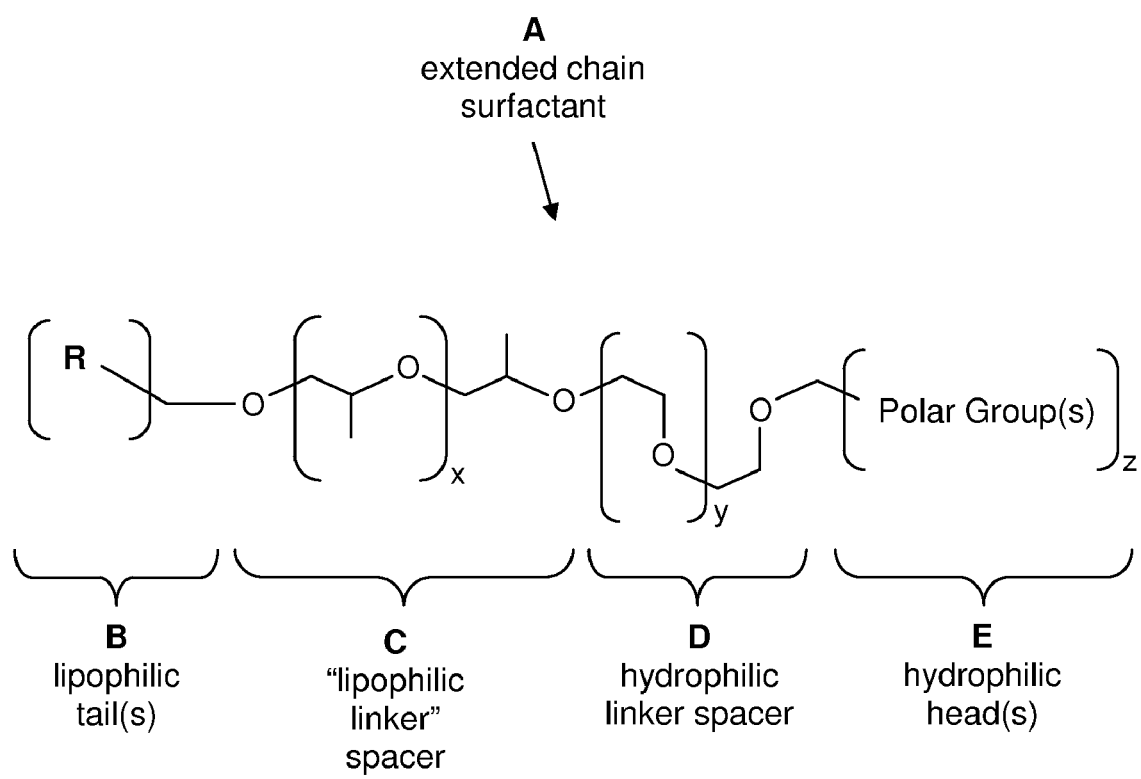

MESOPHASE FLUIDS WITH EXTENDED CHAIN SURFACTANTS FOR DOWNHOLE TREATMENTS

CROSS-REFERENCE TO RELATED APPLICATIONS

This application is a continuation-in-part application from U.S. patent application Ser. No. 12/146,647 filed Jun. 26, 2008, which in turn claims the benefit of U.S. Provisional Application No. 60/947,870 filed Jul. 3, 2007, and is also a continuation-in-part application of U.S. Ser. No. 11/866,486 filed Oct. 3, 2007.

TECHNICAL FIELD

The present invention relates to methods and compositions for treating non-polar materials and/or the difficulties and damage they cause in wellbores and subterranean reservoirs, and more particularly relates, in one non-limiting embodiment, to methods and compositions for treating, reducing and/or removing non-polar materials and/or difficulties and damage caused thereby from wellbores and subterranean reservoirs using mesophase fluids (e.g. microemulsions) containing extended chain surfactants.

BACKGROUND

Formation damage involves undesirable alteration of the initial characteristics of a producing formation, typically by exposure to drilling fluids. The water or solid particles in the drilling fluids, or both, tend to decrease the pore volume and effective permeability of the producible formation in the near-wellbore region. There may be at least three possible mechanisms at work. First, solid particles from the drilling fluid may physically plug or bridge across flowpaths in the porous formation. Second, when water contacts certain clay minerals in the formation, the clay typically swells, thus increasing in volume and in turn decreasing the pore volume. Third, chemical reactions between the drilling fluid and the formation rock and fluids may precipitate solids or semisolids that plug pore spaces.

Reduced hydrocarbon production can result from reservoir damage when a drilling mud deeply invades the subterranean reservoir. It will also be understood that the drilling fluid, e.g. oil-based mud, is deposited and concentrated at the borehole face and partially inside the formation. Many operators are interested in improving formation clean up and removing the cake or plugging material and/or improving formation damage after drilling into reservoirs with oil-based muds.

Drilling fluids used in the drilling of subterranean oil and gas wells along with other drilling fluid applications and drilling procedures are known. In rotary drilling there are a variety of functions and characteristics that are expected of drilling fluids, also known as drilling muds, or simply "muds".

Drilling fluids are typically classified according to their base fluid. In water-based muds, solid particles are suspended in water or brine. Oil can be emulsified in the water which is the continuous phase. Brine-based drilling fluids, of course are a water-based mud (WBM) in which the aqueous component is brine. Oil-based muds (OBM) are the opposite or inverse. Solid particles are suspended in oil, and water or brine is emulsified in the oil and therefore the oil is the continuous phase. Oil-based muds can be either all-oil based or water-in-oil macroemulsions, which are also called invert emulsions. In oil-based mud, the oil may consist of any oil that may include, but is not limited to, diesel, mineral oil, esters, or alpha-olefins. OBMs as defined herein also include synthetic-based fluids or muds (SBMs) which are synthetically produced rather than refined from naturally-occurring materials. SBMs often include, but are not necessarily limited to, olefin oligomers of ethylene, esters made from vegetable fatty acids and alcohols, ethers and polyethers made from alcohols and polyalcohols, paraffinic, or aromatic, hydrocarbons alkyl benzenes, terpenes and other natural products and mixtures of these types.

It would be desirable if compositions and methods could be devised to aid and improve the ability to clean up damage and difficulties caused to the wellbore, the formation, equipment in the wellbore (for instance, stuck pipe), and to remove and/or resolve the problem more completely and easily, without causing additional damage to the formation, wellbore and/or equipment.

SUMMARY

There is provided, in one non-limiting form, a method of treating non-polar material in a wellbore and/or subterranean reservoir that contains non-polar materials. The method involves introducing a mesophase fluid into the wellbore and/or subterranean reservoir and to contact the mesophase fluid with the non-polar material. The mesophase fluid includes components such as: (1) a preformed mesophase fluid which in turn includes at least one extended chain surfactant; and optionally one or more additional surfactant(s) which may be a non-extended chain surfactant, a co-surfactant, and combinations thereof; at least one non-polar fluid; and at least one polar fluid, and (2) in situ mesophase fluid-forming components that include at least one extended chain surfactant, the optional additional surfactant described above, and at least one polar fluid.

An acid may be optionally used to solubilize the contaminant solid particles that may be encountered in the wellbore and/or the formation. The acid may be a mineral acid and/or an organic acid, and in one non-limiting embodiment may be a polyamino carboxylic acid (PACA). Oxidizing agents, water-soluble enzymes (e.g. catalysts), barite dissolvers (e.g. chelants), and combinations thereof may also be used in the fluids herein. Precursors to these components may also be employed, in other words, these additional components may be generated or activated in situ in the subterranean reservoir and/or downhole.

The mesophase fluids of this method may involve thermodynamically stable, macroscopically homogeneous, single phase microemulsions that include a polar phase, a nonpolar phase, an extended chain surfactant, and optionally a cosurfactant or other, conventional surfactant that is not an extended chain surfactant, and optionally an acid, but may also include miniemulsions and nanoemulsions containing these components.

BRIEF DESCRIPTION OF THE DRAWING

The Figure is a schematic illustration of an extended chain surfactant molecule. It will be appreciated that the extended surfactant molecule illustrated in the Figure is not to scale or proportion, and that certain features of may be exaggerated or distorted for illustrative purposes.

DETAILED DESCRIPTION

It has been discovered that subterranean reservoir formation damage, wellbore damage and difficulties with equipment (e.g. stuck pipe in the wellbore) caused by non-polar materials, including but not necessarily limited to, oil-based mud, synthetic-based mud, paraffins, asphaltenes, slugs, emulsions, and combinations thereof may be removed, healed, restored or otherwise remediated, and that these non-polar materials causing the difficulties and/or damage may also be removed, using mesophase fluids. Mesophase fluids are defined herein as selected from the group of a miniemulsion, a nanoemulsion, or a microemulsion in equilibrium with excess oil or water or both (Winsor III), a single phase microemulsion (Winsor IV), whether a water-continuous emulsion or an oil-continuous emulsion of these types. If a non-polar material is being treated, the mesophase fluid may be water-continuous. Mesophase fluids also include collections of components that make these emulsions. These mesophase fluids may be either formed prior to introduction into a wellbore or formed in situ. The mesophase fluids may be single phase microemulsions (SPMEs) formed prior to pumping to the subterranean reservoir, or the mesophase fluids may be microemulsions formed in situ in the subterranean reservoir or an injected mesophase fluid (e.g. microemulsion) could form a new microemulsion incorporating non-polar and polar fluids and particles already present in the formation. This improved clean up method occurs by solubilization of the non-polar material and eventually polar material into the mesophase fluid when the treatment fluid contacts the non-polar material. An in situ mesophase fluid (e.g. microemulsion) may be formed when one or more extended chain surfactant and a polar phase (e.g. water) contact the reservoir formation and solubilize the non-polar material encountered in the porous media. At least one extended chain surfactant is present in all embodiments. Slugs are extremely high viscous fluids formed under dynamic conditions when crude oil or OBM contacts aqueous fluids that contains certain additives that could target emulsification and trapped solids.

In this context, by "eventually", as in eventual solubilization of polar material, it is meant herein that the non-polar material and the extended chain surfactant, together with a non-extended chain surfactant and/or a co-surfactant (a fluid of intermediate polarity), at some point later in time, such as downhole or separately added, contacts a polar fluid, such as reservoir fluids. By "eventually" it is meant that the contact is not necessary or compulsory, but that such eventual contact may not be ruled out. For instance, in order to make a microemulsion it is not always necessary to add an alcohol co-surfactant, but in some instances (e.g. when employing ionic surfactants at low temperature) it is almost necessary or at least it makes things easier.

In the methods and compositions herein, the clean up may be accomplished by changing the OBM and other non-polar materials into a macroemulsion, a nanoemulsion, a miniemulsion, a microemulsion (Winsor III) and/or single phase microemulsion (SPME), such as Winsor IV or similar chemistry, as will be described in U.S. Patent Application Publication No. 2008/0110618 A1, incorporated herein by reference in its entirety. Single phase microemulsions may be defined as bi-continuous, O/W or W/O. In one non-limiting explanation of the phenomenon, a single phase microemulsion formed with the mesophase fluid extended chain surfactant cleaning fluid herein contacts the oil-based mud and other non-polar materials (e.g. filter cake) and forms a microemulsion that water-wets the solid materials. It has been discovered that this contacting may be accomplished without circulating the well, by which is meant pumping fluid through the whole active fluid system, including the borehole and all the surface tanks that constitute a primary system—although circulating the well may be performed in some non-limiting embodiments.

As described, it has also been discovered that the mesophase fluid may be formed in situ downhole. That is, it is not necessary to completely form the mesophase fluid (e.g. microemulsion) on the surface and pump it downhole. As noted, the literature generally describes these microemulsions as single phase microemulsions, referred to as the Winsor IV case of phase behavior, but the present method includes the use of three-phase systems in which the microemulsion is in equilibrium with an excess of one or both the polar phase (brine) and non-polar phase (oil), which is usually referred to as the Winsor III case of phase behavior.

More specifically, the methods and compositions herein involve using an in situ-formed fluid such as a microemulsion or others of the mesophase fluids for removing oil-based mud (OBM) or synthetic oil-based mud (SBM), and reversing the wettability and removing or minimizing formation damage in the subterranean reservoirs of oil or gas wells drilled with SBMs or OBMs. Such mesophase fluids may also be introduced as pills to treat and release stuck pipe and other equipment in the well bore. The in situ mesophase fluid (e.g. microemulsion, nanoemulsion, etc.) may be formed when at least one extended chain surfactant and a polar phase (usually, but not limited to water or brine) contacts the OBM or other non-polar materials and solubilizes the non-polar material of the OBM. It should be understood herein that the term OBM encompasses SBMs.

One of the benefits of the in situ fluid formation of the mesophase fluid is that the treating fluid does not require any additional oil or solvent in the formulation, or at least much less than the proportion that could be solubilized in the final mesophase fluid (e.g. microemulsion), which gives a higher capacity for oil or non-polar material incorporation or treating capability when contacted with the OBM and other non-polar materials. Another benefit is that any particles or other oil-wet contamination turn from oil-wet to water-wet. Additionally, water-wetting improves damage remediation (including, but not limited to, filter cake destruction) when mineral acids, organic acids, oxidizing agents, water-soluble enzymes (e.g. catalysts), or precursors of these components (e.g. in situ acid generators) are spotted into a subterranean reservoir after or during the wettability reversal process, because it favors the contact between the acid and the particles. As the OBM (or SBM) or other oil-wet surfaces and materials are contacted and absorbed and/or the oil-wet, non-polar materials are converted from oil-wet to water-wet during the in situ formation of a fluid, such as a microemulsion or nanoemulsion or precursors of them, the blend of surfactants, at least one of which is an extended chain surfactant, and a polar phase (e.g. water) may also contain acids, barite dissolvers (chelants) or other precursor additives that can dissolve the acid-soluble particles or dissolve the barite and other particulates and also break down any polymeric fluid loss additive (if present). In many cases, the surfactant may be a surfactant blend and is often an extended chain surfactant and co-surfactant mixture, in which the co-surfactant is a short amphiphilic substance such as an alcohol (in non-limiting examples, propanol, butanol, pentanol, hexanol, heptanol, octanol in their different isomerization structures) as well as glycols, and ethoxylated and propoxylated alcohols or phenols. Alcohols are also noted herein as substances of intermediate polarity; that is, intermediate between non-polar substances such as oils and polar substances such as water. As the OBM (or SBM) is contacted and absorbed and/or the oil-wet, non-polar materials are converted from oil-wet to water-wet during the in situ formation of a mesophase fluid, such as a microemulsion or nanoemulsion or precursors of them, the blend of surfactants and a polar phase (e.g. water)

may also contain acids, barite dissolvers (chelants) or other precursor additives that can dissolve the acid-soluble particles or dissolve the barite and other particulates and also break down any polymeric fluid loss additive (if present).

In one non-limiting embodiment, the in situ-formed mesophase fluid may be made using an extended chain surfactant, with in some, non-limiting cases one or more additional surfactants which may be a non-extended chain surfactant, and/or a co-surfactant, a polar fluid and a relatively small amount of non-polar fluid and/or fluid of intermediate polarity. It has been found that it is sometimes helpful when forming an in situ emulsion downhole to inject a water solution of extended chain surfactant already containing some solubilized oil (in a non-restrictive example only from about 1 to about 40% or so). In other words, the injected mesophase fluid may be considered as a single phase microemulsion containing as low as 1% of oil, and then once in the reservoir this fluid will solubilize the oil which is in situ and thus becomes another single phase microemulsion containing much more oil (non-polar material), in a non-limiting instance, about 70 or 80%.

The use of this in situ mesophase fluid (e.g. single phase microemulsion) chemistry in reservoir cleaning optionally allows the direct contact of a chelating agent, such as an acid and/or an acid blend mixed in conventional brine completion fluids (or generated in situ), without causing a high viscosity oil continuous emulsion (sludge) and formation blockage. The action of the single phase microemulsion, e.g., alters the non-polar materials present, which allows a chelating agent (if present) such as an acid or a salt of an acid, such as a poly-amino carboxylic acid (PACA) or polylactic acid and/or a mineral acid or salt thereof, e.g. hydrochloric acid or an organic acid or salt thereof, e.g. acetic acid, or other acid, to solubilize the formation and/or particles that may be present, such as calcium carbonate, hematite, ilmenite, and barite. Particles composed of manganese tetraoxide (in one non-limiting embodiment) may be treated with an in situ mesophase fluid (e.g. a single phase microemulsion, containing an acid or acid blend) providing the acid is an organic acid in one non-limiting embodiment. It has been found that PACAs perform relatively better in an alkaline environment as the salt of these acids, which further differentiates them from the more common acids and salts thereof.

For instance a salt of PACA dissociates calcium from the calcium carbonate treated; the PACA takes on the cation. In a non-limiting example, a Na or K salt of PACA when contacting calcium carbonate contacts and dissolves the calcium salt through cation exchange. The salt forms of PACAs perform relatively better than the plain acid form, but the undissociated acid form still performs the functions and achieves the desired results of the methods and compositions herein. The plain acid form works somewhat better at relatively low pH.

The net effect of such a treatment system will improve an operator's chance of injecting water in a reservoir to maintain reservoir pressure (for example, for injection wells), and improve production rates in producing wells. In either case, non-polar material alteration is accomplished by creating the in-situ fluid (e.g. single phase microemulsion) across the injection/production interval or pumping the pre-formed SPME into the formation.

One non-limiting embodiment OBM material clean up technology herein, also referred to as "one-step" clean up, utilizes preformed mesophase fluids and/or in situ mesophase fluids (single phase microemulsion, e.g.), and optional chelating agent techniques in a single blend to change the oil or invert emulsion of an OBM or other non-polar materials to a microemulsion (or in other in situ mesophase fluid) and simultaneously decompose its acid soluble components. Altering the non-polar materials using a pre-formed mesophase fluid (e.g. SPME) or an in situ mesophase fluid (single phase microemulsion or in other in situ formed fluid) facilitates the elimination of these non-polar materials and oil-wet solids as solubilized in the aqueous solution component of the in situ fluid thus preventing the occurrence of a sludge that could form.

It will be appreciated that it is not necessary for all of the non-polar materials and all of the oil-wet contaminant particles to be removed from a subterranean reservoir for the method and its compositions herein to be considered successful. Success is obtained if more non-polar materials and/or more particles are removed using the mesophase fluids herein, whether not formed in situ (e.g. single phase microemulsion) than if they are not used, or if more non-polar materials and/or particles are removed using the mesophase fluids together with a chelating agent, as compared to the case where no mesophase fluids and/or chelating agents are used. Alternatively, the methods and compositions are considered successful if at least a portion of the non-polar materials is removed. In one non-limiting embodiment at least a majority (>50%) of the non-polar materials is removed. In general, of course, it is desirable to remove as much of the OBM, non-polar materials, contaminants and other particulates as possible. One non-restrictive goal of the methods and compositions herein is to remove non-polar material and oil-wet particles to obtain a high percentage of water injection (in a non-limiting instance, >50% increase in the injection rate) or higher percentage of oil and gas production (e.g. >50%) as compared to the expected production in the case where no microemulsion is used whatsoever. Similarly, it is not necessary for the wettability of all surfaces and materials to be changed from oil-wet to water-wet for such a method to be considered successful; only that some improvement is obtained over the case where no such mesophase compositions and method are used. Alternately, if the method involves a pill treatment to remove stuck pipe, it is not necessary for the pipe or other equipment to be released and the situation resolved only by contact with the emulsion compositions herein; the co-use with mechanical techniques conventionally used to rotate the drill string or move the drill string parallel to the wellbore direction leading to a solution in removing stuck pipe, will be also an indication of a successful application.

The subterranean reservoir clean up technology described herein has a wide range of applications. By combining the chemical aspect of wellbore treatment and/or clean up with displacement techniques, it is believed that subterranean reservoir disadvantages and/or damage after drill-in with OBMs (e.g. invert emulsion fluids) may be significantly reduced or eliminated.

Drilling a well with WBMs may also cause formation damage. For instance, the formation damage caused by WBM includes, but is not necessarily limited to, in-situ water or brine-in-crude oil emulsions, and solids invasion. The water and/or the particles may tend to decrease the pore volume and effective permeability of the formation, and the water may additionally swell certain clay minerals that may be present.

The methods and compositions herein may be used to remove, heal, and/or remediate damage and other undesirable conditions caused by deposits of macromolecules from crude oils, such as the case of deposition of asphaltenes in the reservoir porous media. Other damage that may be removed includes any emulsions that incorporate or include any non-polar material (oil and other hydrocarbons) from the reservoir, or introduced in the drilling mud, as well as other substances injected downhole.

Thus, the methods and compositions herein have the advantages of reduced formation damage and/or remedying difficulties and/or damage in the wellbore, and consequently increased hydrocarbon recovery, and/or increased water injection rate, as compared with an otherwise identical method and composition without mesophase fluids including an optional acid or other component. Microemulsions are thermodynamically stable, macroscopically homogeneous mixtures of at least three components: a polar phase and a nonpolar phase (usually, but not limited to, water and organic phase) and at least one surfactant—in this embodiment an extended chain surfactant, often more than one surfactant, but at least one of which is an extended chain surfactant, for instance with a co-surfactant such as an alcohol or another additional surfactant such as a conventional, non-extended chain surfactant, particularly when ionic surfactants are used, as mentioned in the reference: M. MIÑANA-PEREZ, A. GRACIAA, J. LACHAISE, J. L. SALAGER, "Systems Containing Mixtures of Extended Surfactants and Conventional Nonionics. Phase Behavior and Solubilization in Microemulsion", 4th World Surfactants Congress, Barcelona, Spain, June 3-7, 1996. *Proceedings 4th World Surfactants Congress*, Vol. 2, pp. 226-234, Edited for A.E.P.S.A.T. by Roger de Llúria, Barcelona, Spain, 1996. An older, but useful reference for Winsor 3 phase behavior is J. L. SALAGER, M. BOURREL, R. S. SCHECHTER, W. H. WADE, "Mixing Rules for Optimum Phase Behavior Formulation of Surfactant-oil-water Systems", *Soc. Petrol. Eng. J*, Vol. 19, pp. 271-278 (1979) and another, more recent article discussing surfactant mixtures is R.E. ANTON, J. M. ANDEREZ, C. BRACHO, F. VEJAR, J. L. SALAGER, "Practical Surfactant Mixing Rules Based on the Attainment of Microemulsion-oil-water Three-phase Behavior Systems," *Interfacial Processes and Molecular Aggregation*. R. Narayanan Ed., *Advances Polymer Science*, Vol. 218, pp. 83-113 (2008) Springer-Verlag.

Suitable co-surfactants include, but are not necessarily limited to, mono or poly-alcohols, low molecular weight organic acids or amines, polyethylene glycol (PEG), low ethoxylation solvents such as butoxyethanol and the like, and mixtures thereof. Microemulsions form spontaneously and differ markedly from the thermodynamically unstable macroemulsions, which depend upon intense mixing energy for their formation. Microemulsions are well known in the art, and attention is respectfully directed to S. Ezrahi, A. Aserin and N. Garti, "Chapter 7: Aggregation Behavior in One-Phase (Winsor IV) Microemulsion Systems", in P. Kumar and K. L. Mittal, ed., *Handbook of Microemulsion Science and Technology*, Marcel Dekker, Inc., New York, 1999, pp. 185-246.

The referenced chapters describe the types of microemulsion phase behavior defined by Winsor: Winsor I, Winsor II and Winsor III. A system or formulation is defined as: Winsor I when it contains a microemulsion in equilibrium with an excess oil phase; Winsor II when it contains a microemulsion in equilibrium with excess water; and Winsor III when it contains a middle phase microemulsion in equilibrium with excess water and excess oil. The author also describes Winsor IV as a single-phase microemulsion, with no excess oil or excess water. Although not wishing to be limited by any one theory, it is believed that the microemulsions formed in the methods and compositions herein are of the Winsor IV type, which means the entire system is a microemulsion phase at least at first and somewhere in the process, with the possibility of ending with one or two excess phases as the injected formulation is diluted by the reservoir fluids. The thermodynamically stable single phase Winsor IV microemulsion could evolve by a change in formulation or composition into the formation of a miniemulsion or nanoemulsion, which is a two-phase system either Winsor I or Winsor II with submicron size droplets which could be stable for long period of time, but not permanently stable as a microemulsion, as explained in reference J. L. Salager, "Emulsion Phase Inversion Phenomena" in *Emulsions and Emulsion Stability*, J. Sjoblöm Ed., $2^{nd}$ Edition, Chap. 4, pp. 185-226, Taylor and Francis, London (2006).

Surfactants suitable for creating the pre-formed and in situ mesophase fluids (e.g. single phase microemulsions) herein include, but are not necessarily limited to non-ionic, anionic, cationic and amphoteric surfactants and in particular, blends thereof, with the proviso that at least one of the surfactants is an extended chain surfactant. Co-solvents or co-surfactants such as alcohols are optional additives used in the microemulsion formulation. Suitable nonionic surfactants include, but are not necessarily limited to, alkyl polyglycosides, sorbitan esters, polyglycol esters, methyl glucoside esters, alcohol ethoxylates or alkylphenol ethoxylates (the latter of which may be better in solubilization than alcohol ethoxylates, and are of low toxicity concerns). Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates, and mixtures thereof. Suitable cationic surfactants include, but are not necessarily limited to, arginine methyl esters, alkanolamines and alkylenediamides. In one non-limiting embodiment at least two surfactants in a blend may be used to create single phase microemulsions in situ, as well as the other in-situ fluids.

The mesophase treating fluids herein should include at least one extended chain surfactant, such as those containing a non-ionic spacer-arm central extension and an ionic or nonionic polar group. The non-ionic spacer-arm central extension may be the result of polypropoxylation, polyethoxylation, or a combination of the two, in non-limiting embodiments. In one non-limiting embodiment, the spacer arm may contain from 2 to 20 propoxy moieties and/or from 0 to 20 ethoxy moieties. Alternatively, the spacer arm may contain from 2 independently up to 16 propoxy moieties and/or from 2 independently up to 8 ethoxy moieties, where "independently" with respect to ranges herein means any combination of a lower threshold with an upper threshold. In a particular non-restrictive version, the spacer arm contains both propoxy and ethoxy moieties. The polypropoxy portion of the spacer arm may be considered lipophilic, however, the extended chain surfactant may also contain a hydrophilic portion to attach the hydrophilic group, which may generally be a polyethoxy portion, in one non-limiting embodiment having two or more ethoxy groups. These portions are generally in blocks, rather than being mixed, e.g. randomly mixed. It should be understood that the extended chain surfactant is an intramolecular mixture so that the extended chain surfactant achieves some gradual change from hydrophilic to lipophilic across the water/oil interface. Such surfactants help increase and thicken the interfacial region between the water and oil phases, which is desirable since this lowers interfacial tension and increases solubilization.

The lipophilic moiety of the extended surfactant may include C8 to C30 linear or branched hydrocarbon chains, which may be saturated or unsaturated. Carbon numbers as high as 30 for the lipophilic moiety may result if the moiety is highly branched, e.g. squalane, but in most cases may be no higher than C18. Suitable hydrophilic polar heads of the extended surfactant include, but are not necessarily limited to, groups such as polyoxyethylene (as described above), sulfate, ethoxysulfate, carboxylate, ethoxy-carboxylate, C6 sugar, xylitol, di-xylitol, ethoxy-xylitol, carboxylate and xytol, carboxylate and glucose.

These extended chain surfactants attain low tension and/or high solubilization in a single phase microemulsion with high molecular weight alkanes used in drilling muds, with additional properties including, but not necessarily limited to, insensitivity to temperature and to the nature of the oil being treated or absorbed. For instance, in one non-limiting embodiment the emulsions may function over a relatively wide temperature range of from about 20 to about 280° C., alternatively from about 20 to about 180° C. (350° F.), In another non-limiting embodiment the extended chain surfactants have an anionic group and a nonionic extension, hence they are an "intramolecular" mixture of a surfactant that becomes more hydrophilic when temperature increases and another that becomes less hydrophilic. Thus, these surfactants have the potential of cancelling out these effects to provide a substance that is less sensitive to temperature. Extended chain surfactants also avoid unwanted precipitation of the surfactant and the undesirable formation of viscous phases. When more conventional surfactants are used, an alcohol is often used as a co-surfactant to avoid or inhibit precipitation and viscous phases formation. Extended chain surfactants have these benefits on their own, although use of a co-surfactant may also be beneficial.

Further details about extended surfactants may be found in J. L. Salager, et al. "Enhancing Solubilization in Microemulsion. State of the Art and Current Trends," *Journal of Surfactants and Detergents*, Vol. 8, No. 1, January 2005. This review paper describes how to improve solubilization and concomitantly decrease tension. It will be appreciated that within this context solubilization means attaining a single phase, and low tension refers to three-phase with easy displacement and emulsification.

Further, J. L. Salager, et al., "Amphiphilic Mixtures versus Surfactant Structures with Smooth Polarity Transition across Interface to Improve Solubilization Performance," CESIO 2008—7th World Surfactant Congress, Paris, Session: Design and Analysis; Paper No. O-A17, 22-25 Jun. 2008, describes four ways that solubilization may be improved. The first is by making the surfactant bigger on both the hydrophilic and lipophilic sides. However, if this idea is pushed too far, when the surfactant tail becomes longer than 16 carbon atoms (if linear) or 30 (if highly branched), the surfactant undesirably precipitates and thus no longer functions.

The second method involves mixing different surfactants, one hydrophilic and another lipophilic, to also increase the interaction (with oil and water) or extend the "reach" of the surfactant mixture adsorbed at interface and thus increase the solubilization. This method has also a serious drawback when pushed too far, namely it may cause selective partitioning or fractionation. The hydrophilic component (of the mixture) goes into bulk water, whereas the lipophilic one tends to migrate into oil (bulk phase); hence only a (sometimes small) proportion of the surfactant mixture goes to interface where it produces the desired effect (low tension or microemulsion). It may be noted that the interface composition (in a two or three phase system) is essentially the same as in a microemulsion. Hence a microemulsion may be understood as a folded interface. Consequently if the surfactant does not go all to the interface, it does not go into the microemulsion, and it is lost from being effective for its desired purpose.

A third method involves the concept of a "linker" that J. L. Salager, et al. introduced in the early 1990s as another way to improve solubilization. A linker is an additive which "sticks to" or "associates with" the surfactant and links it with the molecules in the bulk phase, and hence increase the "reach" of the surfactant molecules which are adsorbed at interface, thus enhancing their performance. The lipophilic linker (the most important in practice) just prolongates the tail of the surfactant. The result is just like a longer tail, hence a better interaction with the oil and a higher solubilization is achieved. However a difference from the approach of just increasing the tail length in the first method is that there is no precipitation drawback because the linker stays in the oil phase. (A longer tail would be attached to the rest of the surfactant when it goes in the water and would thus precipitate there). A problem with this third method is that the linker does not participate in the interface and is somewhat "lost" in the bulk phase. It means that it fractionates in large part in the bulk, although it is segregated close to the interface. It is desired that the substance added entirely goes to the interface because it is there where it acts. If part of the substance goes elsewhere (generally into the bulk phase) it is becomes rather useless and the efficiency decreases.

A fourth method involves the so-called extended surfactant structure in which the spacer arm is lipophilic but not too much so (propylene oxide moieties tend to be slightly hydrophobic) and thus does not precipitate. The extended chain structure permits the surfactant to be much longer with a bigger hydrophobic group and a better solubilization, as in the first method when the tail is made longer, but without the precipitation penalty (because the tail is not so hydrophobic as a longer alkyl group), nor fractionation into the bulk phase (because the parts that make the intramolecular mixture cannot separate and migrate into the bulk phases), and as a consequence, most of the extended surfactant stays at interface and the efficiency is high.

In the intramolecular mixture nature of the surfactant a gradual change is achieved from hydrophilic to lipophilic across the phase interface, i.e. the interfacial region obtained is relatively thick. The thicker the interfacial region is, the lower the tension and the higher the solubilization. Additionally, extended surfactants are the only ones to be able to produce good microemulsions (at low surfactant concentration) with long chain alkanes like hexadecane (the kind of oil used in drilling muds) and with natural oils (edible oils and derivatives such as esters or biofuels). With conventional surfactants the performance is quite the opposite and worse. With carefully designed extended surfactants a better performance may be achieved with these oils than with ordinary light alkanes. In non limiting embodiments, carefully designing may include factors such as the length of the spacer arm, the proportion of polypropoxylation to polyethoxylation in the spacer arm and the type of lipophilic and hydrophilic moieties in the extended surfactant molecule.

The Figure presents a schematic or general illustration of one embodiment of an extended chain surfactant molecule A having one or more lipophilic tails B (designated R for straight, branched or cyclic alkyl or alkyl aryl groups), a "lipophilic linker" spacer arm C (composed primarily of, if not exclusively of, propoxy moieties), a hydrophilic linker spacer arm D (composed primarily of, if not exclusively of, ethoxy moieties) and one or more hydrophilic heads E (polar groups). As previously discussed x may range from 2 to 20 and y may range from 0 to 20. The R tail(s) contain a total of 8 to 30 carbon atoms, and the value of z may range from 1 to 3, alternatively from 1 to 2. In an alternate embodiment butoxy moieties may be used in the lipophilic spacer arm C in place of or in addition to propoxy moieties. This structure of continuous change from lipophilic moiety to hydrophilic moiety permits the positioning of these molecules perpendicular to the oil-water interface with no significant folding on itself, hence it favors an increased thickness in the transition zone and improves solubilization and reducing tension. Specific examples of each of these portions or moieties of the molecule A are described elsewhere herein. One non-limiting, acceptable example is a carboxylate head extended chain surfactant having the formula ($C_{12}$—$PO_7$-$EO_7$—COONa) and the structure:

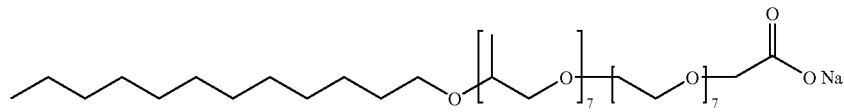

One non-restrictive benefit of the extended chain surfactants is that some of them exhibit an almost constant solubilization even with different oils (see in CESIO 2008 paper FIG. 3 showing a constant solubilization parameter (SP) for $C_{12}$-10PO-sulfate), which means that flexibility to formulate with a variety of oils is achieved. Extended chain surfactants may also be optionally mixed with other conventional surfactants to obtain a desired mesophase fluid of single phase or low tension.

In one non-limiting embodiment, the extended chain surfactant is present in a mesophase emulsion (e.g. single phase microemulsion (SPME)) in an amount ranging from about 0.1% w/w to about 20% w/w (a weight % basis). Alternatively, the extended chain surfactant may be present in an amount ranging from about 0.1% w/w independently up to about 5% w/w. When the extended chain surfactant is part of in situ emulsion-forming components pumped or introduced down hole to form a mesophase fluid in situ where the non-polar materials to be treated are in place, it may be present in an amount ranging from about 1% w/w to about 30% w/w, alternatively in an amount ranging from about 2% w/w independently up to about 10% w/w.

As mentioned, in another non-restrictive embodiment, the mesophase fluid (SPME, in situ fluid formulation, e.g. macroemulsion, nanoemulsion, etc.) may contain a co-surfactant which may be an alcohol having from about 3 to about 10 carbon atoms, in another non-limiting embodiment from about 4 to about 6 carbon atoms. A specific example of a suitable co-surfactant includes, but is not necessarily limited to butanol, propanol, pentanol, hexanol, heptanol, octanol (in their different isomerization structures). These co-surfactants may be alkoxylated, e.g. ethoxylated and/or propoxylated, although in most cases sufficient ethoxylation should be present to accomplish the purposes of the methods herein. In one non-restrictive embodiment the number of ethoxy units ranges from about 3 to about 15, alternatively from about 6, independently up to about 10.

The proportion of co-surfactant to be used with the surfactant is difficult to specify in advance and may be influenced by a number of interrelated factors including, but not necessarily limited to, the nature of the surfactant, the nature of the co-surfactant, the type of drilling fluid or non-polar material being treated, removed, displaced or otherwise affected, wellbore conditions, and the like. In one non-limiting embodiment, a fluid to be pumped includes a surfactant blend of polyethoxylated alkyl sulfate and polyglycerol ester (such as PG 8-10 ester available from Oleon N.V.) that has a molar ratio of free OH/esterified OH of 3.4/1, optionally with an alkyl alcohol ethoxylated with 7.5 or higher EO.

Extended surfactants and co-surfactants have a different role (and structure, as noted). Co-surfactants are relatively smaller molecules, as previously described, generally alcohols with 4 to 8 carbon atoms, that go into the microemulsion (in between the surfactant molecules) to introduce some disorder (since they are smaller than the extended chain surfactants they cannot be arranged as regularly as molecules which have exactly the same size) and consequently such co-surfactants avoid the formation of liquid crystals gel-type phases. This geometric type of disorder is the role of the co-surfactant. Co-surfactants are needed in most cases with ionic surfactants because the ionic head groups are charged and thus interact very strongly between them and with water and thus produce a rigid structure, that is in most case a liquid crystal (i.e. a more or less solid gel) at optimum formulation or Winsor III case. On the contrary, nonionic surfactants of the polyethoxylated type (or also polyglucoside type) have a nonionic head group that has no charge, hence with weaker interactions, not strong enough to result in a solid. Moreover the ethoxylation reaction (as the propoxylation reaction) and the addition of "pieces" of starch, such as in polyglucosides head groups, is a random process and thus the length of the polyethylene oxide or polysugar head group is variable. Hence there results a mixture of different products, longer and shorter around some average, which also results in disorder, Hence, a less rigid structure results, i.e. a microemulsion instead of a gel. This is why co-surfactants are not always needed when nonionic surfactants are used. Contrariwise, co-surfactants are generally necessary with ionic surfactants, but because the head group (e.g. sulfate or carboxylate) is the same in all molecules and also because it produces stronger interactions because of the charge.

Extended surfactants also mix with conventional surfactants and they provide an extra reach on both sides of the interface. When conventional surfactants and extended surfactants are mixed there are two degrees of freedoms to adjust both the formulation (to be in the Winsor III case) and to adjust solubilization (to the proper value for the given oil phase). Another reason to use mixtures of extended chain surfactants with at least one other additional surfactant, is that mixtures results in general in better performance. Also, the extended chain surfactants are mixtures themselves because the polypropoxylated central spacer has a variable length from the random propoxylation reaction. Hence extended surfactants, even the sulfated ones which are ionic, are less likely to form gels because they are mixtures. Consequently co-surfactants (e.g. alcohols) might not always be needed with ionic extended surfactants, since the down hole temperature could be high enough to provide enough disorder.

Extended surfactants have a central part that could be larger than both head and tail, particularly if they have 10 or 15 propylene oxide groups, hence they are much larger than conventional surfactants. They may be made much longer also on the tail and head side (than, for instance ALFOTERRA® surfactants available from Sasol North America). In summary, any conventional surfactant work are expected to be useful additional surfactants together with the extended chain surfactants described herein.

With respect to proportions, the larger the extended surfactant size the smaller the amount is necessary in the mixture with conventional surfactant. For instance, an "extra large" extended chain surfactant, for instance having a branched tail with 20-30 carbon atoms, an intermediate extension or spacer with 15 propylene oxide groups and a head with 10 ethylene oxide groups and a sulfate at the end (which will exhibit a relatively low solubility in water or oil when used alone) will be used in a small amount (in a non-limiting example, less than 1-2%).

In one non-limiting embodiment herein, the mesophase fluid contains a non-polar liquid, which may include a synthetic fluid including, but not necessarily limited to, ester fluids; paraffins (such as PARA-TEQ™ fluids from Baker Hughes Drilling Fluids) and isomerized olefins (such as ISO-TEQ™ from Baker Hughes Drilling Fluids). However, diesel and mineral oils such as ESCAID™ 110 hydrocarbon fluid (from Exxon) or ECD 99-DW oils (from TOTAL) can also be used as a non-polar liquid in preparing the fluid systems of herein. Other suitable non-polar liquids include, but are not necessarily limited to, limonene, pinene and other terpenes, xylene, mutual solvents, and the like. As noted previously, an advantage of forming the active mesophase formula (e.g. nanoemulsion, single phase microemulsion, etc.) in situ is that less non-polar liquid needs to be used (as compared with a pre-formed mesophase fluid) since all or most of the non-polar liquid is found in the non-polar materials, OBM (or SBM) itself. This gives a higher capacity for the microemulsion, e.g., to solubilize the oil and other substances of the non-polar materials.

It will be appreciated that the amount of in situ mesophase fluid to be created or formed and the amounts of in situ-forming components (polar, nonpolar and an extended chain surfactant and co-surfactant or conventional surfactant, if present) to be added or included are difficult to determine and predict in advance with much accuracy since it is dependent upon a number of interrelated factors including, but not necessarily limited to, the brine type, the OBM or SBM type, the temperature of the formation, the particular extended chain surfactant or surfactant blend used, whether a chelating agent or acid is present and what type, etc. Nevertheless, in order to give some idea of the quantities used, in one non-limiting embodiment, the proportion of non-brine or non-aqueous components in the in situ mesophase fluid (e.g. single phase microemulsion) may range from about 15 up to about 85 volume %, even up to about 90 volume %, and in other non-limiting embodiments may range from about 1 to about 20 volume % in a diluted microemulsion, sometimes called micellar solutions, and from about 70 to about 95 volume % in another diluted microemulsion, sometimes called an inverse micellar solution.

It is expected that brine will be a common component of the in situ mesophase fluid (e.g. single phase microemulsion), and any of the commonly used brines, and salts to make them, are expected to be suitable in the compositions and methods herein. Although water is expected to be the polar liquid used to make the mesophase fluids in situ, it will be appreciated that other liquids of intermediate polarity such as alcohols and glycols, alone or together with water, may be used.

In the non-limiting embodiment where the in situ mesophase fluid (e.g. single phase microemulsion) contains at least one chelating agent, the chelating agent should be capable of solubilizing or dissolving at least some of the particulate materials present. The chelating agent may be one or more inorganic acids or salts thereof including, but not necessarily limited to, hydrochloric acid, sulfuric acid, and/or organic acids including, but not necessarily limited to, an organic agent or salt thereof, e.g. acetic acid, formic acid and mixtures thereof. In one non-limiting embodiment, the acid may be only one mineral acid or only one organic acid.

In many embodiments, the in situ mesophase fluid may contain at some point a chelating agent such as polylactic acid and/or a polyamino carboxylic acid (PACA) of the acrylic or maleic type, or carboxylated polysaccharides, or a salt of PACA. Suitable PACAs and other chelating agents include, but are not necessarily limited to, nitrilotriacetic acid (NTA), ethylenediamine tetraacetic acid (EDTA), trans-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), hydroxyethylethylenediamine triacetic acid (HEDTA), triethylenetetramine hexaacetic acid (TTHA), trans-1,2-diaminocyclohexane tetraacetic acid (DCTA), tripolyphosphates, polyphosphates, pyrophosphates, alpha-ether carboxylates, oxy-diacetate salts, carboxymethyl tartronate (CMT) and carboxymethyl oxy-succinate (CMOS), citric, tartaric and tartronic salts and mixtures thereof.

The concentration of chelating agent in the mesophase fluid (e.g. single phase microemulsion) has a lower limit of about 1 volume %, alternatively of about 5 volume %, and an upper limit of about 30 volume %, alternatively about 20 volume %, and in another non-restrictive embodiment up to about 15 volume %.

There are various ways by which the optional chelating agent may be delivered according to the procedure herein. The chelating agent may be added to the pumped fluid with the components to form the mesophase fluid, e.g., in situ; or may be added before (as a presoak) or after the in situ mesophase fluid (e.g. single phase microemulsion) treatment; or may be added to the mesophase soak solution once it is formed in place before removing the majority of the non-polar materials and OBM (e.g. invert emulsion) and combinations thereof.

With further specificity, the methods and compositions herein may concern one-trip clean up fluids designed to physically change an OBM (e.g. an invert emulsion) and other non-polar materials and optionally acidify the acid soluble components present. The method not only physically changes the nature of the non-polar materials, the resulting oil components which are incorporated into the single phase microemulsion (e.g.) formation in situ and then further microemulsified or solubilized, allow for ease of water injection, in the case of injection wells, or ease of production through completion screens, in the case of production wells. With the conversion of the external oil to internal emulsified oil in water, plus the optional decomposition of minerals (e.g. particles e.g. calcium carbonate and other acid-soluble components) by chelating agents, most of the non-polar fluid and particulate material is either removed or micro-sized to the extent that only a minimal or reduced amount of damaging components remain in the subterranean reservoir.

In one non-limiting embodiment and in still further detail, the compositions and methods herein utilizes a pre-formed mesophase fluid or in situ-formed mesophase fluid to convert an OBM and oil-wet particles to a water-based fluid and water-wet particles. The benefits of such conversions, often called inversion, are several. When non-polar materials are oil wet and pose compatibility problems for certain completion operations, such as water injection and gravel packing, water-based or water-wet components are naturally compatible with injection water and brine-based gravel pack carrier fluids. Additionally, WBMs and water-wet particles are ideal for damage remediation of the subterranean reservoir when mineral acids, organic acids, oxidizing agents, water soluble enzymes (catalysts) and in situ acid generators are spotted in a wellbore after (or during) the treatment.

The value of such a conversion using a single soak solution with all its functional components is that the OBM (e.g. invert emulsion) and other non-polar materials may be converted to water-based or water-continuous materials containing dissolvable particulates and fluid loss control additives that may be removed in a single operational step.

In another non-limiting embodiment, the salts suitable for use in creating the brine include, but are not necessarily limited to, ammonium chloride, sodium chloride, potassium chloride, calcium chloride, sodium bromide, calcium bromide, sodium formate, potassium formate, cesium formate, magnesium chloride or acetate and combinations thereof. The density of the brines may range from about 8.4 lb/gal to about 15 lb/gal (about 1 to about 1.8 kg/liter), although other densities may be given elsewhere herein.

This technology does not require or discriminate against any invert emulsion. In other words, the mesophase fluid may be applied to reservoir clean up for any OBM system regardless of base oil type or emulsifier used to formulate the mud. This versatility allows an operator flexibility to formulate the drilling fluid based on wellbore needs. This is not the case in some prior methods whereby highly specific amine emulsifiers are needed because they require acid protonation to reverse the wettability. In the technology herein, the chelating agent is only used for removal of acid soluble bridging components. In one non-limiting embodiment the methods and compositions are practiced in the absence of amine emulsifiers, such as rosin amines and/or amine emulsifiers.

Another feature relative to other OBM, invert emulsion or other non-polar material removal methods is that the oil phase of the OBM emulsion is micro-emulsified into the mesophase fluid (or in other pre-formed or in situ fluid, such as nanoemulsion, miniemulsion or single phase microemulsion) by soaking, that is simple contacting, letting the diffusion produce the mixing over a time span ranging from a few minutes to a few days. The treatment process reduces the energy necessary for the microemulsion to form when compared to previous methods. This efficiency eliminates or reduces the number of pipe trips and decreases the time required to complete the well.

It will be appreciated that the mesophase surfactant solution described herein may be used to solubilize base oils, solvents, oily materials and the like in other contexts besides subterranean formations. Such other applications include, but are not limited to, cleaning metal or glass parts of industrial equipment, substrates such as metal, wood or plastic floors, and walls, treating oil contaminated drill cuttings and the like.

Again, while the in situ fluid may be referred to as a "microemulsion" or "single phase microemulsion", it should be appreciated that the methods and mesophase compositions are expected to apply to other in situ fluids including, but not limited to miniemulsions, nanoemulsions, and all types of microemulsions.

In the foregoing specification, the invention has been described with reference to specific embodiments thereof, and has been suggested as effective in providing effective methods and compositions for removing non-polar materials from subterranean reservoirs and formations. However, it will be evident that various modifications and changes may be made thereto without departing from the broader spirit or scope of the invention as set forth in the appended claims. Accordingly, the specification is to be regarded in an illustrative rather than a restrictive sense. For example, specific combinations of components and other components for forming the pre-formed or in situ mesophase fluids, such as extended chain surfactants, co-surfactants, conventional non-extended chain surfactants, chelating agents, acids, solvents, non-polar liquids, etc. and proportions thereof falling within the claimed parameters, but not specifically identified or tried in a particular mesophase cleaning composition to improve the removal of non-polar materials herein, are anticipated to be within the scope of this invention.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:

1. A method of treating non-polar material in a wellbore containing non-polar material, the method comprising:
   introducing a mesophase fluid into the wellbore to contact the non-polar material with the mesophase fluid, where the mesophase fluid comprises:
   in situ mesophase fluid-forming components comprising:
   at least one extended chain surfactant selected from the group consisting of extended surfactants with a propoxylated spacer arm having from 2 to 20 propoxy moieties and an ethoxylated spacer arm having from 0 to 20 ethoxy moieties; and
   at least one polar fluid,
   forming the mesophase fluid in situ in the wellbore; and
   a procedure selected from the group consisting of:
   removing at least a portion of non-polar material from a wellbore containing the non-polar material by incorporating at least part of the non-polar material into a mesophase fluid formed in situ in the wellbore, and removing the mesophase fluid incorporating the non-polar material from the wellbore;
   introducing the mesophase fluid into the wellbore as a fluid pill, where the fluid pill is selected from the group consisting of a water-wetting pill, a drive-weighted spacer, and combinations thereof;
   releasing a stuck drill string; and
   combinations thereof;
   where the non-polar material is selected from the group consisting of oil-based mud, synthetic-based mud, paraffins, asphaltenes, slugs, and combinations thereof.

2. The method of claim 1 where the extended chain surfactant has a lipophilic moiety selected from the group consisting of linear or branched, saturated or unsaturated hydrocarbon chains having from 8 to 50 carbon atoms.

3. The method of claim 1 where the extended chain surfactant has a hydrophilic polar head selected from the group consisting of polyoxyethylene, sulfate, ethoxysulfate, carboxylate, ethoxy-carboxylate, C6 sugar, xylitol, di-xylitol, ethoxy-xylitol, carboxylate and xytol, carboxylate and glucose.

4. The method of claim 1 where the extended chain surfactant has a lipophilic spacer arm and a hydrophilic polar head, where the extended chain surfactant does not precipitate in the mesophase fluid.

5. The method of claim 1 where the extended chain surfactant is present in a concentration from about 0.1% w/w to about 20% w/w.

6. The method of claim 1 where the in situ mesophase fluid-forming components further comprise a fluid selected from the group consisting of a non-polar fluid, a fluid of intermediate polarity and combinations thereof.

7. The method of claim 1 where the mesophase fluid further comprises at least one additional surfactant selected from the group consisting of a non-extended chain surfactant, a co-surfactant, and combinations thereof.

8. The method of claim 7 where the co-surfactant is a surface active substance selected from the group consisting of mono or poly-alcohols, organic acids or amines, polyethylene glycol, ethoxylation solvents and mixtures thereof.

9. A method of treating non-polar material in a wellbore containing non-polar material, the method comprising:
   introducing a mesophase fluid into the wellbore to contact the non-polar material with the mesophase fluid, where the mesophase fluid comprises:
      in situ mesophase fluid-forming components comprising:
         at least one extended chain surfactant; and
         at least one polar fluid,
   forming the mesophase fluid in situ in the wellbore; and
   a procedure selected from the group consisting of:
      removing at least a portion of non-polar material from a wellbore containing the non-polar material by incorporating at least part of the non-polar material into a mesophase fluid formed in situ in the wellbore, and removing the mesophase fluid incorporating the non-polar material from the wellbore;
      introducing the mesophase fluid into the wellbore as a fluid pill, where the fluid pill is selected from the group consisting of a water-wetting pill, a drive-weighted spacer, and combinations thereof;
      releasing a stuck drill string; and
      combinations thereof;
   where the extended chain surfactant is present in a concentration from about 0.1% w/w to about 20% w/w, and where the extended chain surfactant is selected from the group consisting of extended surfactants with spacer arms having from 2 to 20 propoxy moieties, from 0 to 20 ethoxy moieties, and combinations thereof, and where the non-polar material is selected from the group consisting of oil-based mud, synthetic-based mud, paraffins, asphaltenes, slugs, and combinations thereof.

10. The method of claim 9 where the extended chain surfactant has a lipophilic moiety selected from the group consisting of linear or branched, saturated or unsaturated hydrocarbon chains having from 8 to 50 carbon atoms.

11. The method of claim 9 where the extended chain surfactant has a hydrophilic polar head selected from the group consisting of polyoxyethylene, sulfate, ethoxysulfate, carboxylate, ethoxy-carboxylate, C6 sugar, xylitol, di-xylitol, ethoxy-xylitol, carboxylate and xytol, carboxylate, and glucose.

12. The method of claim 9 where the extended chain surfactant has a lipophilic spacer arm and a hydrophilic polar head, where the extended chain surfactant does not precipitate in the mesophase fluid.

13. The method of claim 9 where the in situ mesophase fluid-forming components further comprise a fluid selected from the group consisting of a non-polar fluid, a fluid of intermediate polarity and combinations thereof.

14. The method of claim 9 where the mesophase fluid further comprises at least one additional surfactant selected from the group consisting of a non-extended chain surfactant, a co-surfactant, and combinations thereof.

15. The method of claim 14 where the co-surfactant is a surface active substance selected from the group consisting of mono or poly-alcohols, organic acids or amines, polyethylene glycol, ethoxylation solvents and mixtures thereof.

16. A method of treating non-polar material in a wellbore containing non-polar material, the method comprising:
   introducing a mesophase fluid into the wellbore to contact the non-polar material with the mesophase fluid, where the mesophase fluid comprises:
      in situ mesophase fluid-forming components comprising:
         at least one extended chain surfactant; and
         brine;
   forming the mesophase fluid in situ in the wellbore; and
   a procedure selected from the group consisting of:
      removing at least a portion of non-polar material from a wellbore containing the non-polar material by incorporating at least part of the non-polar material into a mesophase fluid formed in situ in the wellbore, and removing the mesophase fluid incorporating the non-polar material from the wellbore;
      introducing the mesophase fluid into the wellbore as a fluid pill, where the fluid pill is selected from the group consisting of a water-wetting pill, a drive-weighted spacer, and combinations thereof;
      releasing a stuck drill string; and
      combinations thereof;
   where the extended chain surfactant has a lipophilic spacer arm and a hydrophilic polar head, where the extended chain surfactant does not precipitate in the mesophase fluid, and where the non-polar material is selected from the group consisting of oil-based mud, synthetic-based mud, paraffins, asphaltenes, slugs, and combinations thereof.

17. The method of claim 16 where the extended chain surfactant is selected from the group consisting of extended surfactants with propoxylated spacer arms, surfactants with ethoxylated spacer arms, surfactants with propoxylated and ethoxylated spacer arms, and combinations thereof.

18. The method of claim 17 where the spacer arms contain alkoxy moieties selected from the group consisting of from 2 to 20 propoxy moieties, from 0 to 20 ethoxy moieties, and combinations thereof.

19. The method of claim 16 where the extended chain surfactant is present in a concentration from about 0.1% w/w to about 20% w/w.

20. The method of claim 16 where the extended chain surfactant has a lipophilic moiety selected from the group consisting of linear or branched, saturated or unsaturated hydrocarbon chains having from 8 to 50 carbon atoms.

21. The method of claim 16 where the extended chain surfactant has a hydrophilic polar head selected from the group consisting of polyoxyethylene, sulfate, ethoxysulfate, carboxylate, ethoxy-carboxylate, C6 sugar, xylitol, di-xylitol, ethoxy-xylitol, carboxylate and xytol, carboxylate, and glucose.

22. The method of claim 16 where the in situ mesophase fluid-forming components further comprise a fluid selected from the group consisting of a non-polar fluid, a fluid of intermediate polarity and combinations thereof.

23. The method of claim 16 where the mesophase fluid further comprises at least one additional surfactant selected from the group consisting of a non-extended chain surfactant, a co-surfactant, and combinations thereof.

24. The method of claim 23 where the co-surfactant is a surface active substance selected from the group consisting of mono or poly-alcohols, organic acids or amines, polyethylene glycol, ethoxylation solvents and mixtures thereof.

* * * * *